Nov. 25, 1969     CARL-ERIK GRANQVIST     3,480,770
APPARATUS FOR GENERATING AN ANGLE-REPRESENTATIVE VOLTAGE
Filed April 27, 1967     2 Sheets-Sheet 1

INVENTOR
CARL-ERIK GRANQVIST
BY Larson and Taylor
ATTORNEYS

Nov. 25, 1969 CARL-ERIK GRANQVIST 3,480,770
APPARATUS FOR GENERATING AN ANGLE-REPRESENTATIVE VOLTAGE
Filed April 27, 1967 2 Sheets-Sheet 2

INVENTOR
CARL-ERIK GRANQVIST

BY *Larson and Taylor*

ATTORNEYS

United States Patent Office 3,480,770
Patented Nov. 25, 1969

3,480,770
APPARATUS FOR GENERATING AN ANGLE-REPRESENTATIVE VOLTAGE
Carl-Erik Granqvist, Lidingo, Sweden, assignor to AGA Aktiebolag, Lidingo, Sweden, a corporation of Sweden
Filed Apr. 27, 1967, Ser. No. 634,336
Claims priority, application Sweden, Apr. 28, 1966, 5,813/66
Int. Cl. G06g 7/22
U.S. Cl. 235—189                                4 Claims

ABSTRACT OF THE DISCLOSURE

To derive a signal having a phase angle representing the angle of rotation $\alpha$ of a rotatable member, signals of the frequencies $n\omega$ and $m\omega$ are phase-modulated by multiples $n\alpha$ and $m\alpha$, respectively, of the angle and the signals thus obtained are heterodyned to form a difference-frequency signal of the type $\sin(n-m)(\omega t+\alpha)$.

FIELD OF THE INVENTION

The present invention relates to means to determining the angular position of a rotatable member.

BACKGROUND OF THE INVENTION AND DESCRIPTION OF THE PRIOR ART

It is often necessary to obtain an indication or a value representing the annular position of a rotatable member. Particularly for telemetering purposes it is not practical to translate the measurement to a remote point by mechanical or optical means and it is then preferrable to transform the measurement into an electrical signal, which can more easily be translated to different receivers.

It is previously known to use synchros for the remote indication of angles. The accuracy may be about 0.5° and even up to 0.1°, however the latter type of device is very expensive and the signal is relatively weak in comparison with the noise level.

It is further known to increase the accuracy of the angular measurement with the aid of a gearing having a gear ratio of, for example, 1:10, the slower gear being connected to the rotatable member whose angular position is to be indicated and serving also to provide a coarse indication of the position of the fast-running element.

It it is desired to obtain a high degree of accuracy, the gear ratio would have to be correspondingly high. This causes difficulties in connection with the extreme precision that would be required in the machining of the mechanical gearing.

SUMMARY OF THE INVENTION

According to the present invention, a pair of signals having frequencies $n\omega$ and $m\omega$ are phase modulated by multiples of the angle to be represented, the multiples being in the same ratio as the frequencies, i.e. $n:m$, and the signals obtained in this manner are heterodyned to derive a difference-frequency signal. The angle of the latter signal will then have the phase $(n-m)\alpha$ and represent the angle of rotation $\alpha$. A preferable value for $m$ is $n-1$.

The device according to the present invention is of particular advantage where it is important that the rotatable member whose angular position is to be measured should be subjected to a minimum of external forces. By supplying multiple frequency signals to phase modulators used in the system lessening the influence of the unavoidable mechanical forces can be achieved. These higher frequencies $n\omega$ and $(n-1)\omega$ require rather weak magnetic fields for producing a useful output voltage and these weak magnetic fields are accompanied by only small mechanical forces. Further, these mechanical forces will themselves have a high frequency which also reduces the effect on the rotatable member. As an example, the rotatable member may be connected with a toothed wheel which modulates the phase by changing the magnetic field of a modulator and the increased frequency then leads to a better utilization of the field, which contributes to lessening the mechanical forces.

THE DRAWINGS

DESCRIPTION OF THE PREFERRED EMBODIMENTS

Figure 1:
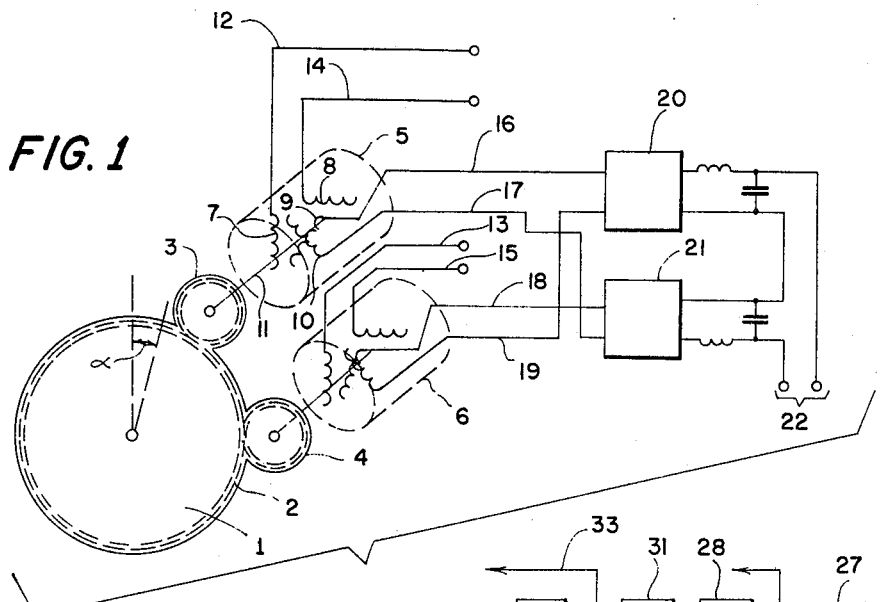
FIG. 1 shows an embodiment of the invention in diagrammatic form.

In FIG. 1, reference 1 designates a rotatable member, the angular position $\alpha$ of which is to be measured and having the form of a disc 1 provided with teeth 2 along its circumference. The number of teeth may be of any arbitrary number such as $nm$, where $n$ and $m$ themselves are arbitrary numbers. A preferable value of $m$ is $$m=n-1$$

In engagement with the wheel 1 there are provided a pair of gears 3 and 4. The gear 3 has $m$ and the gear 4 has $n$ teeth. The gear ratios for the gears 3 and 4 are then $n$ and $m$, respectively.

Connected with gear 3 is the input axle 11 of a phase modulator 5 shown as a phase-splitter of well-known type having a rotatable coupling member comprising a pair of windings 9 and 10 placed at right angles to each other and a pair of fixed windings 7 and 8 also at right angles to each other. Windings 7 and 8 form a pair of input circuits connected by leads 12 and 14 to corresponding terminals and windings 9 and 10 form output circuits connected with output leads 16 and 17, respectively. Phase modulator 6 is identical with phase modulator 5 and has corresponding input leads 13 and 15 and output leads 18 and 19. There are supplied to leads 12 and 14 voltages of the form $V \sin n\omega t$ and $V \cos n\omega t$, respectively. There appears in the output 16 a voltage of the form $$V \sin(n\omega t + n\alpha) = V \sin A \quad (1)$$

Similarly, the output 17 obtains a voltage of the form $$V \cos(n\omega t + n\alpha) = V \cos A \quad (2)$$

It should be noted in this connection that if $\alpha$ is the rotation performed by member 1, then owing to the choice of gear ratios, gears 3 and 4 have performed rotations of the values $n\alpha$ and $m\alpha$, respectively.

The frequencies of the input voltages supplied to the generators are in the same ratio as the gear ratios of the generators. Therefore, the input voltages supplied to 13 and 15 are of the form $V \sin m\omega t$ and $V \cos m\omega t$, respectively. This leads to the following form of the output voltage on lead 18:

$$V \sin (m\omega t + m\alpha) = V \sin B \qquad (3)$$

and correspondingly, on lead 19 there appears an output voltage:

$$V \cos (m\omega t + m\alpha) = V \cos B \qquad (4)$$

It is clear from Equations 1 to 4 that the auxiliary variables A and B satisfy the equation $$A - B = (n - m)(\omega t + \alpha) \qquad (5)$$

In view of the well-known formula $$\sin (A - B) = \sin A \cos B - \cos A \sin B \qquad (6)$$

it is clear that the value of $\sin (A-B)$ can be obtained with the aid of two multiplicative modulators. This is done in FIG. 1, where 20 and 21 are multiplicative modulators having a pair of inputs each. Modulator 20 receives the output voltages from 16 and 19 and modulator 21 the outputs from 17 and 18. The outputs of the two modulators are the terms to the right of Equation 6 and these voltages are subtracted from each other, the difference corresponding to the right-hand member of Equation 6 appearing at the output terminals 22. This output voltage is therefore of the form $V \sin (A-B)$, or, which is the equivalent thereof, $V \sin (n-m)(\omega t+\alpha)$. Obviously, it would be possible, by changing the order of the output leads 16 to 19, to obtain an output voltage representing $V \cos (A-B)$.

Figure 3:
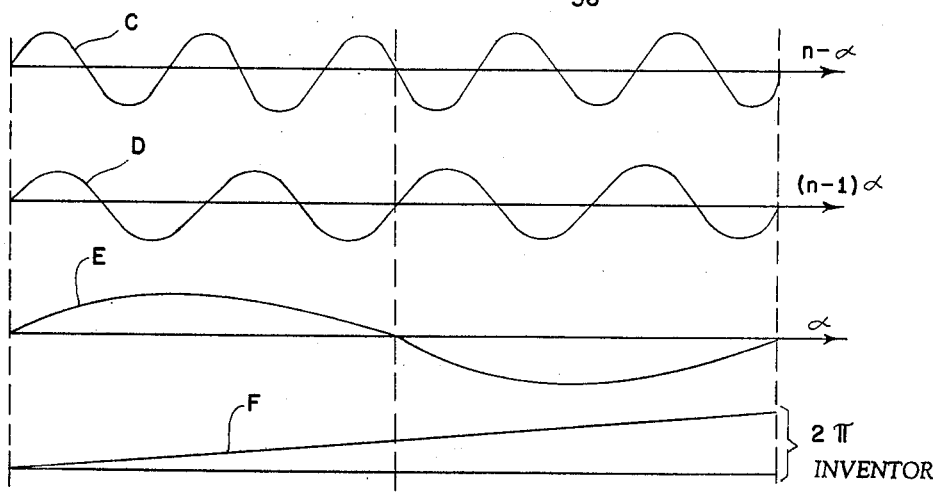
FIG. 3 shows graphs illustrating the operation of the embodiment.

FIG. 3 shows by way of example the phase position at time $t=0$ for various rotations and for various voltages. It is assumed for simplicity's sake that the gear ratios are $n=5$ and $m=4$. The abscissa represents the angular rotations $n\alpha$ and $(n-1)\alpha$ as well as $\alpha$, these being the angular values of gear 3, gear 4 and rotating member 1, respectively. The curves C, D and E represent the voltages $V \sin n\omega t$, $V \sin (n-1)\omega t$ and $V \sin \omega t$, respectively. It is apparent from the figure that the phase difference between curves C and D increases from 0 to $2\pi$ as $\alpha$ goes from 0 to $2\pi$, this latter variation being represented by curves F in FIG. 3. It is also apparent that the steepness of the zero passage of the curves C and D is substantially higher than the corresponding value for the curve E, which leads to a corresponding improvement in the accuracy.

In an alternative embodiment, the difference frequency can be obtained at the output of modulator 20, since this output signal is of the form $$\sin A \cos B = \tfrac{1}{2} \sin (A+B) + \tfrac{1}{2} \sin (A-B)$$

and the sum frequency $(A+B)$ can be removed by filtering.

Figure 4:
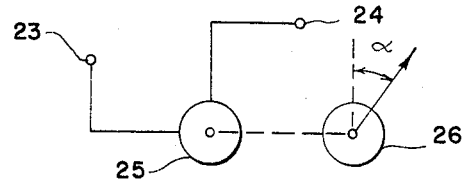
FIG. 4 illustrates a manner of reproducing the angular measure.

The angular value $\alpha$ represented by the voltage $V \sin (\omega t + \alpha)$ appearing at the terminals 22 if $m=(n-1)$ can be utilized for indicating the value of $\alpha$ with the aid of a servo system of a type known per se, as is shown in FIG. 4. There is applied to the input terminal 23 the voltage $V \sin (\omega t + \alpha)$ and a reference voltage $V \sin \omega t$ is applied to a second input terminal 24. 25 designates a well-known type of goniometer having a pair of fixed windings at right angles to each other and to which are applied the sine and cosine components of the input voltage at terminal 24. There is then obtained from the movable winding a voltage of a phase representing the angular position of the movable coil. The phase of this voltage is compared with that of the voltage applied at terminal 23 and when phase equality is present, the value of $\alpha$ can be read off on a scale 26. This type of indicator is well-known in the art.

Figure 2:
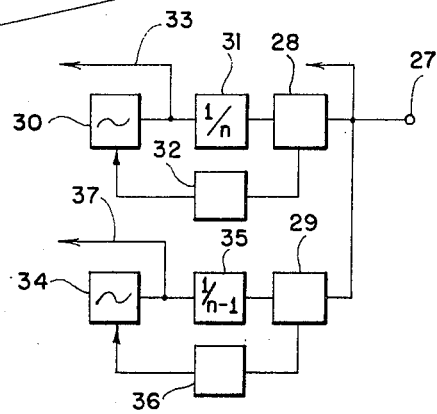
FIG. 2 shows a possible arrangement for producing input signals for the FIG. 1 arrangement.

The frequencies $n\omega$ and $(n-1)\omega$ can be obtained in a circuit of the type shown in FIG. 2. A reference frequency which may have the customary value of 400 Hz., is applied to a terminal 27 which is connected to the input circuit of a pair of frequency detectors 28 and 29. Detector 28 is connected with an oscillator 30 via a frequency dividing network 31 having a dividing ratio of $1/n$ and is also connected through a filter 32 to the oscillator for controlling the frequency thereof in such a manner that the two frequencies applied to detector 28 are equal. If the frequency at terminal 27 is $\omega$, the frequency delivered by oscillator 30 will then be $n\omega$ and the corresponding voltage $V \sin n\omega t$ is supplied via lead 33 to lead 12. To lead 14 is applied the voltage $V \cos n\omega t$, which can be obtained by a 90° phase delay in well-known manner.

Similarly, frequency detector 29 is connected to the oscillator 34 via a frequency divider 35 on the one hand and via a filter 36 on the other hand. The dividing ratio of 35 is $1/(n-1)$ and the voltage appearing in the output lead 37 is therefore of the form $V \sin (n-1)\omega t$, this voltage being supplied to input circuit 13.

It was assumed for simplicity in connection with FIG. 1 that a mechanical gearing is provided between the rotatable member and generators 5 and 6. However, mechanical gearings consume energy and also require high precision machining. If the problem is to indicate the position of a gyro, any mechanical influence on the gyro has to be avoided. This can be done by replacing the mechanical gearings in FIG. 1 with toothed wheels and modulators of either electromagnetic, optical or capacitive type.

Figure 5:
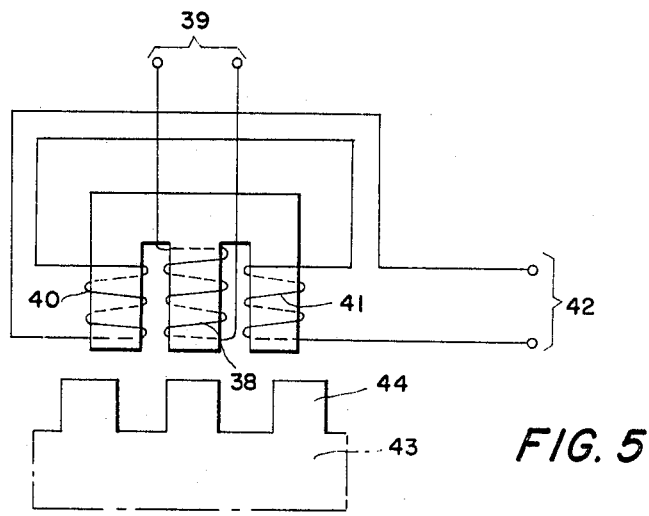
FIGS. 5 and 6 show alternative embodiments of the phase modulators of the FIG. 1 arrangement.

FIG. 5 illustrates the principle of a magnetic modulator comprising an E-core 37, the middle leg of which is provided with a winding 38, to which a voltage $V \sin n\omega t$ is applied via terminals 39. The outer legs have windings 40 and 41 in series connected to terminals 42. Cooperating with core 37 is a toothed wheel 33 of magnetic material, which corresponds to rotatable member 1 with the teeth 2. The number of teeth 44 of the wheel 43 is $n$, the teeth being in the magnetic path of the core 37, so that the voltage $V \sin n\omega t$ is modulated when the teeth 44 pass in front of core 37. In this manner the voltage at the output terminals appears in the form $V \sin n\omega t \cos n\alpha$.

Figure 6:
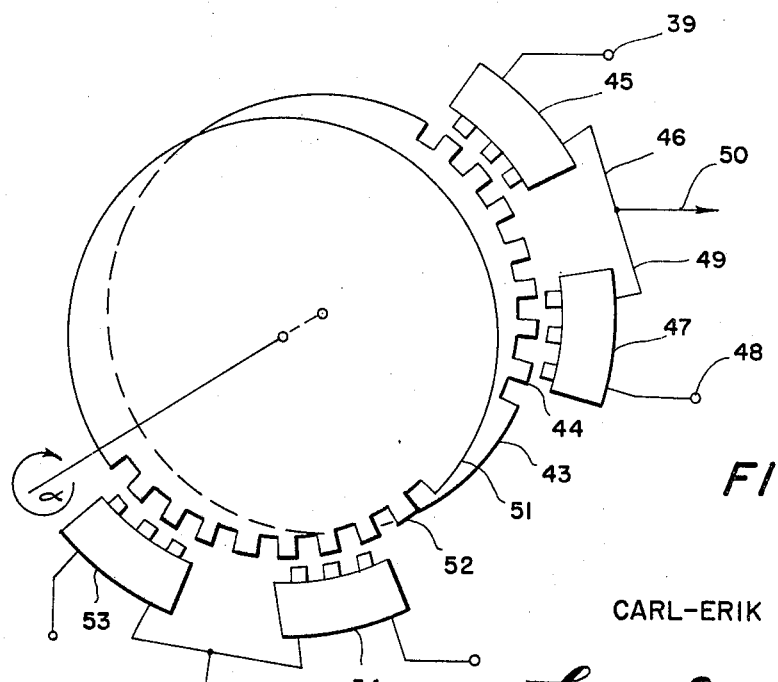

In order to obtain the desired voltage $V \sin (n\omega t + n\alpha)$ there are provided, as shown in FIG. 6, two systems of the type shown in FIG. 5. Cooperating with toothed wheel 43 and teeth 44 is a magnetic modulator 45 such as shown in FIG. 5, to the input 39 of which there is applied a voltage $V \sin n\omega t$. This leads to the appearance of a voltage $V \sin n\omega t \cos n\alpha$ in output lead 46. Further cooperating with wheel 43 is a second magnetic modulator 47, which is phase-displaced 90° relative to modulator 45 and has applied to it at terminal 48 a voltage $V \cos n\omega t$. In this manner, a voltage $V \cos n\omega t \sin n\alpha$ is produced in output lead 49. The output voltages of leads 46 and 49 are added to a resulting output voltage in lead 50 in accordance with the equation $$V \sin n\omega t \cos n\alpha + V \cos n\omega t \sin n\alpha$$
$$= V \sin (n\omega t + n\alpha) \qquad (7)$$

FIG. 6 shows a second toothed wheel 51 having $n-1$ teeth 52, this wheel being coaxial with wheel 43. The teeth 52 cooperate with a pair of magnetic modulators 53 and 54, which are mutually phase-displaced by 90° and have applied to them voltages of the form $$V \sin (n-1) \omega t \text{ and } V \cos (n-1) \omega t$$

respectively. This causes a voltage $$V \cos [(n-1)\omega t + (n-1)\alpha]$$

to appear in the output lead 55.

The invention is intended to be used in connection with gimbal mounted gyroscopes, for indicating the position of the gimbals or for controlling the movements of these gimbals. In such a case it is of importance that the mechanical forces acting upon the gimbals are as small as possible and this is achieved in the present invention by using these multiple frequencies for the alternating currents supplied to the phase modulators. These higher frequencies $n\omega$ and $(n-1)\omega$ require rather weak electromagnetic fields for producing a useful output voltage and these weak electromagnetic fields are accompanied by only small mechanical forces. Furthermore, these mechanical forces will have a high frequency which also reduces the effect on the gimbals.

To estimate the degree of accuracy that can be obtained according to the invention, it may be assumed that the gear ratios of the generators 5 and 6 are 64 and 63, respectively. These ratios can be obtained in the simplest manner by providing the rotatable member with 64:63 teeth, the gear 3 having 63 teeth and the gear 4 having 64 teeth. This leads to an accuracy of 1:4096 or, expressed in digital measure, 12 bits. This requires that the generators 5 and 6, are accurate to within 1/64, corresponding to 5°. Normally, such elements have an accuracy of about 0.5° and it is therefore easy to increase the accuracy of the system to the order of 1:16384, corresponding to 14 bits.

What is claimed is:

1. An arrangement for generating a signal representing changes in the angular position of a rotatable member comprising a first phase modulator and a first gear connecting said first phase modulator to the rotatable member; a second phase modulator and a second gear connecting said second phase modulator to the rotatable member, the difference between the gear ratios being equal to unity; means for supplying said phase modulators with alternating currents, the ratio between the frequencies of the alternating currents being equal to the ratio between the gear ratios; and multiplicative modulators having the inputs thereof connected to the outputs of the phase modulators and having the outputs thereof connected in a voltage subtracting circuit to common output terminals.

2. An arrangement as defined in claim 1 further comprising a gear wheel connected to the rotatable member and in engagement with said first and second gears.

3. An arrangement as defined in claim 1 in which the phase modulators comprise phase-splitters including a rotatable coupling member comprising a pair of windings placed at right angles to each other and a pair of fixed windings placed at right angles to each other, said fixed windings being supplied with alternating currents in phase quadrature and having the same frequency.

4. An arrangement as defined in claim 1 wherein said phase modulators comprise electromagnetic phase modulators, each one comprising an E-core which includes primary and secondary windings thereon and which cooperates with a toothed wheel of magnetic material connected to the rotatable member.

References Cited

UNITED STATES PATENTS

| | | | |
|---|---|---|---|
| 3,021,481 | 2/1962 | Kalmus et al. | 328—133 X |
| 3,187,195 | 6/1965 | Stefanov | 328—133 X |
| 3,219,938 | 11/1965 | Greening | 328—133 |
| 3,250,904 | 5/1966 | Vasu et al. | 235—186 |
| 3,286,245 | 11/1966 | Cozart | 328—133 X |
| 3,358,127 | 12/1967 | Dolan | 235—186 X |

MALCOLM A. MORRISON, Primary Examiner

R. W. WEIG, Assistant Examiner